W. B. WESCOTT.
MOTION PICTURE CAMERA.
APPLICATION FILED SEPT. 11, 1916.

1,383,357.

Patented July 5, 1921.
6 SHEETS—SHEET 1.

Inventor:
William B. Wescott,
by Roberts, Roberts & Cushman
Attorneys.

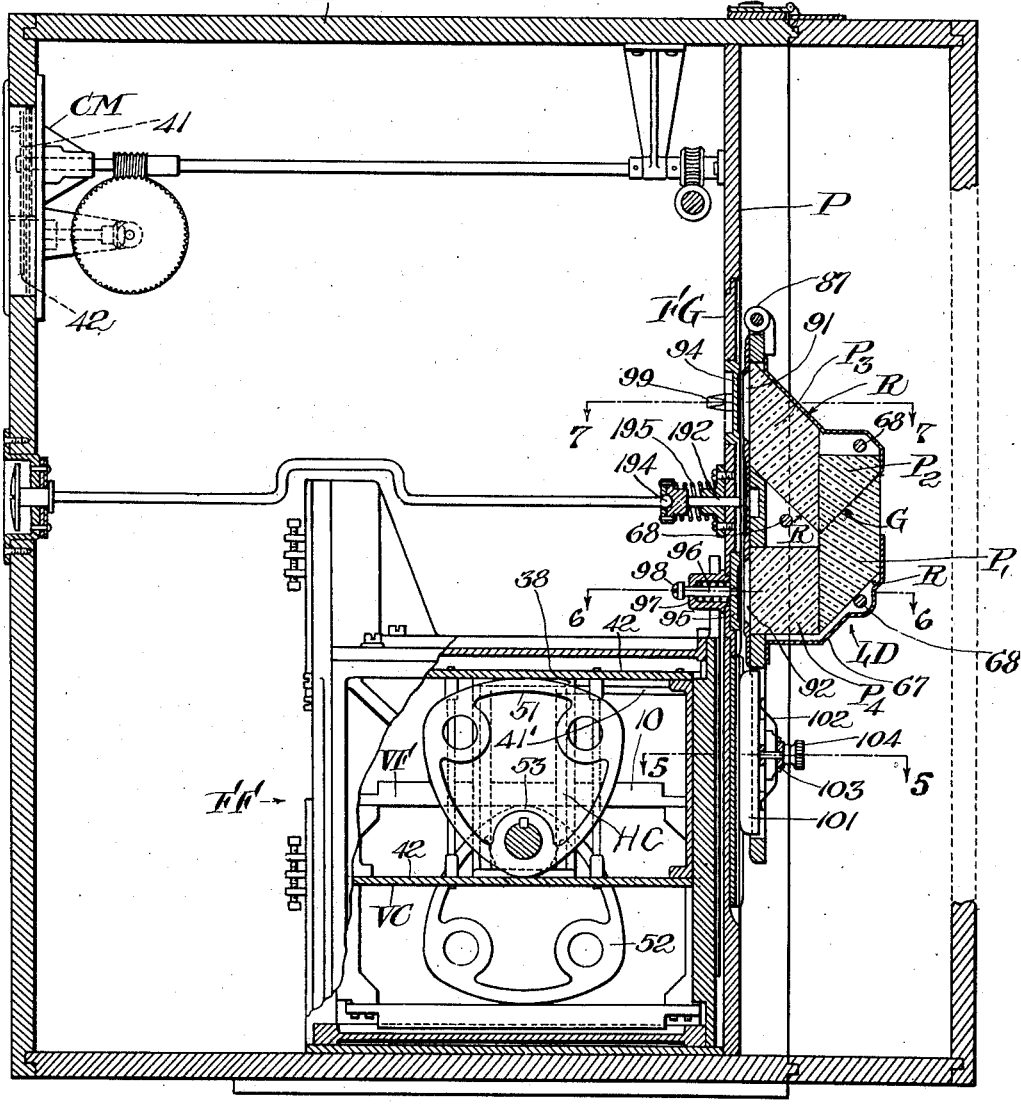

W. B. WESCOTT.
MOTION PICTURE CAMERA.
APPLICATION FILED SEPT. 11, 1916.
1,383,357.
Patented July 5, 1921.
6 SHEETS—SHEET 5.
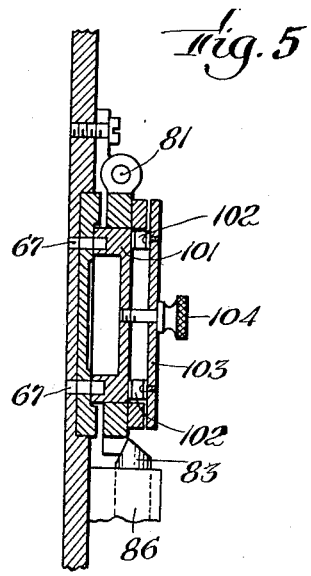
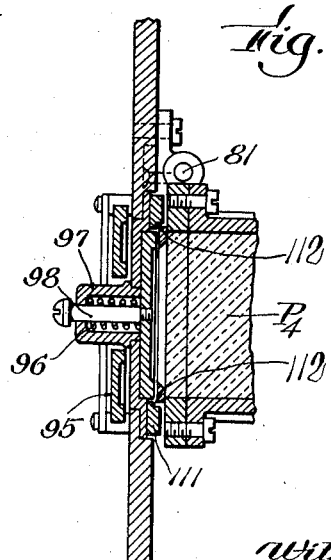
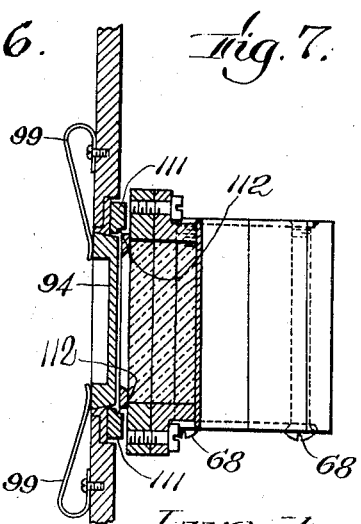

W. B. WESCOTT.
MOTION PICTURE CAMERA.
APPLICATION FILED SEPT. 11, 1916.
1,383,357.
Patented July 5, 1921.
6 SHEETS—SHEET 6.
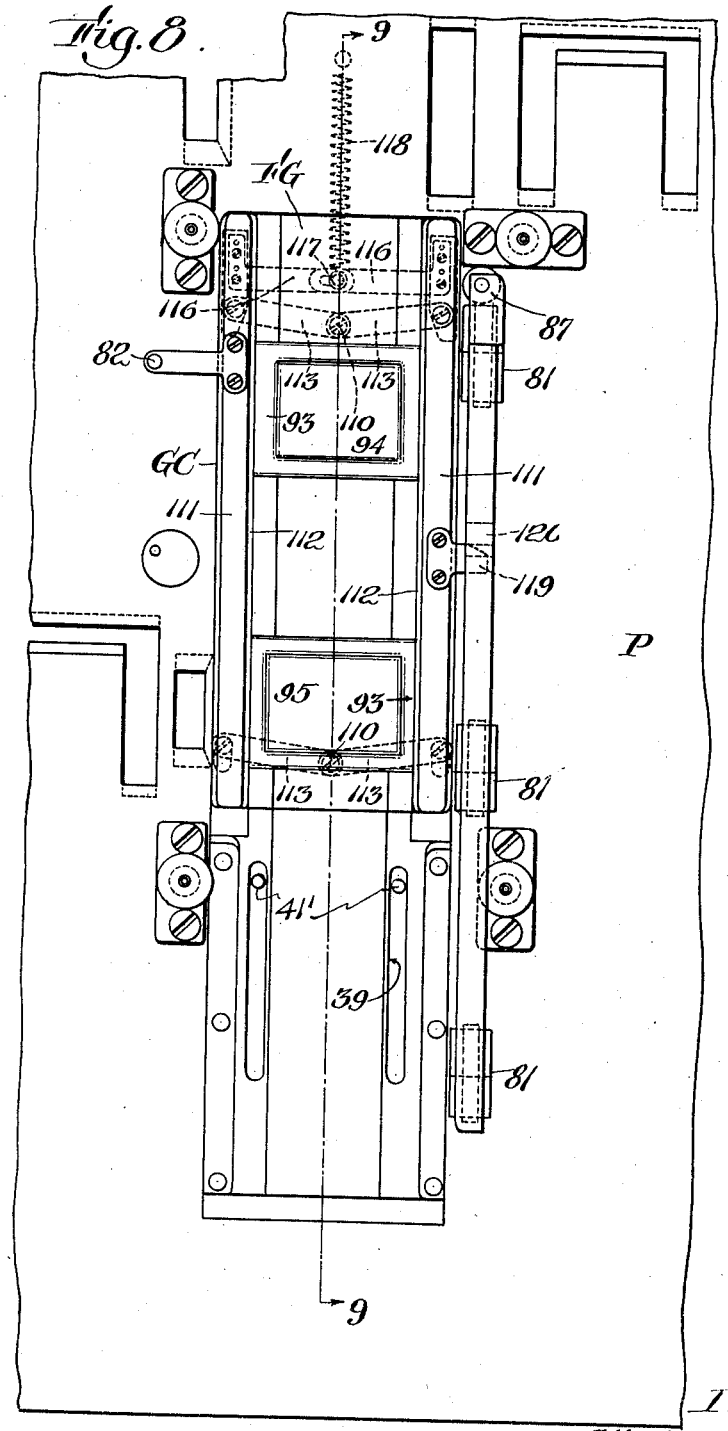
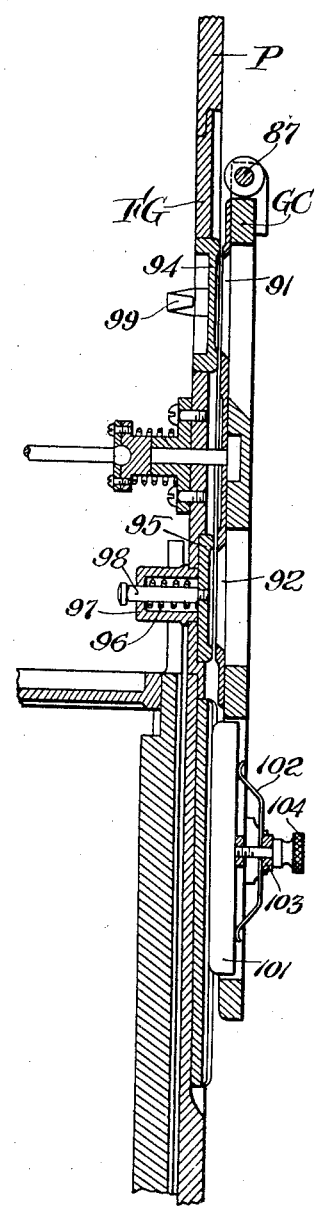
Inventor:
William B. Wescott,
by Roberts, Roberts & Cushman
Attorneys.

UNITED STATES PATENT OFFICE.

WILLIAM BURTON WESCOTT, OF WELLESLEY, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

MOTION-PICTURE CAMERA.

1,383,357.  Specification of Letters Patent.  Patented July 5, 1921.

Application filed September 11, 1916. Serial No. 119,377.

*To all whom it may concern:*

Be it known that I, WILLIAM BURTON WESCOTT, a citizen of the United States, and resident of Wellesley, in the county of Norfolk and State of Massachusetts, have invented new and useful Improvements in Motion-Picture Cameras, of which the following is a specification.

This invention relates to motion picture apparatus, and more particularly to a motion picture camera of the intermittent feed type adapted to take a plurality of simultaneous pictures of the same scene from the same point of view.

It is likewise very desirable, in motion picture cameras of the above mentioned type, that the exposures be produced on the film in precise alinement, notwithstanding variations in the width of the film, and to this end I have provided yielding guides for accurately positioning the film while the latter is passing through the film gate. The guides are preferably so arranged that when a film varying in width is passed therebetween, the guides are moved in synchronism, either apart and in the direction of film travel or toward each other and in a direction opposite to the direction of film travel.

A further object of the invention is to provide means operating upon the film as it is intermittently fed through the film gate to hold one side thereof, for example the image side, against one side of the film passage during periods of film rest and automatically to release the film from contact with the side of the film passage while the film is being advanced. The preferred means for accomplishing this result comprise means for intermittently feeding the film through the film gate in a plane substantially parallel with but slightly removed from the side of the film passage and yielding means for lightly urging the film against the side of the film passage. Due to the quick advancement of the film through the film gate by the intermittently acting feed mechanism, that portion of the film in the film gate is tensioned a sufficient amount, during periods of advancement, to overcome the force of the yielding means tending to urge the film against the side of the film passage whereby the film is released from contact with the side of the film passage during periods of film advancement.

Other objects attained by my invention will be apparent from the following description and the accompanying drawings, in which—

Fig. 4 is a vertical longitudinal section through the center of the camera;

Fig. 5 is a horizontal section of the film gate taken on line 5—5 of Fig. 4;

Fig. 6 is a horizontal section of the film gate taken on line 6—6 of Fig. 4;

Fig. 7 is a horizontal section of the film gate taken on line 7—7 of Fig. 4;

Fig. 8 is a front elevation of a portion of the partition P showing the film gate and cover, the latter being open; and Fig. 9 is a vertical longitudinal section of the film gate taken on line 9—9 of Fig. 8.

The camera mechanism is housed within a box B of ordinary construction having a cover C pivoted to the top of the box to swing upwardly. The box is divided into two compartments by the partition P, which carries most of the camera mechanism on its front and rear sides.

Figure 1:
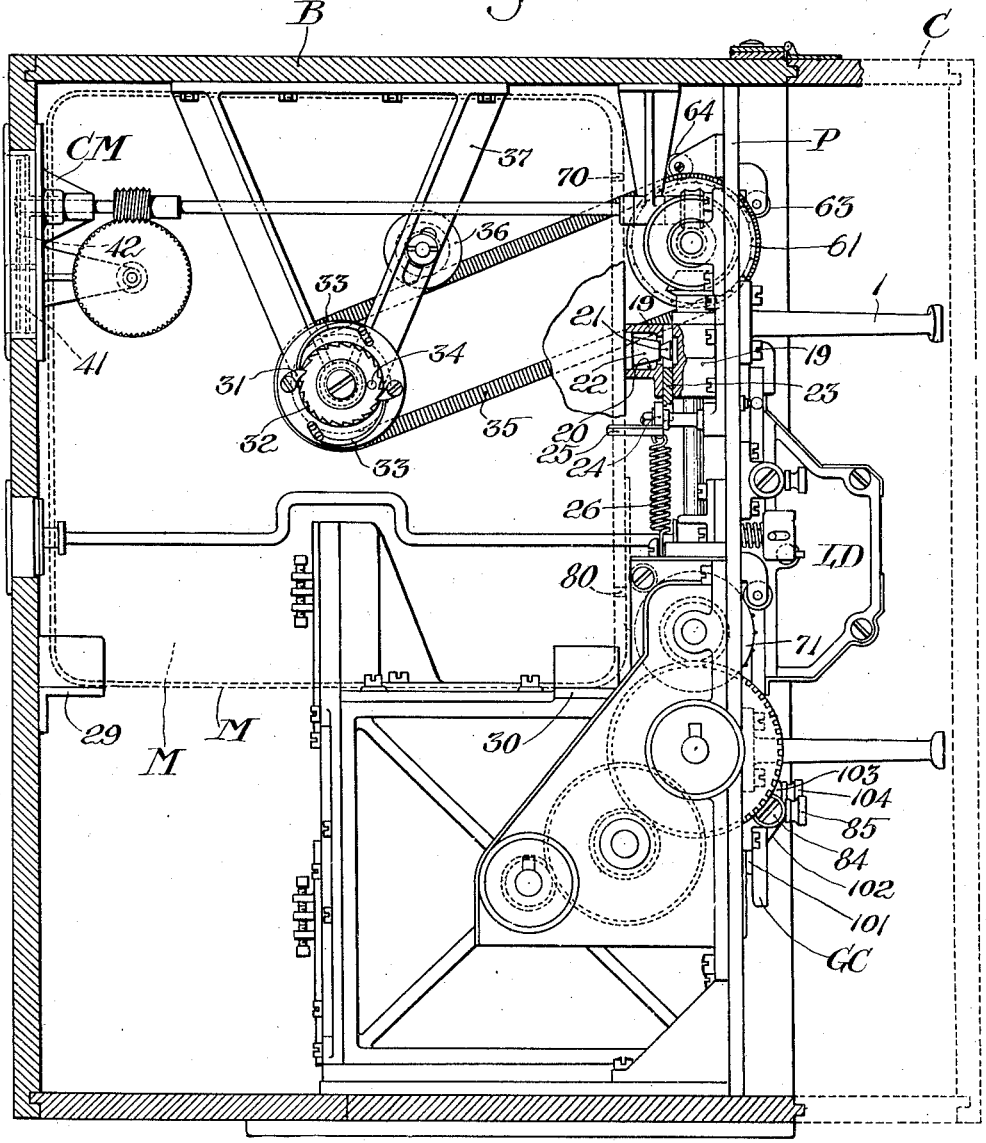
Figure 1 is a side elevation of the interior mechanism of the camera showing the box in cross section and showing the position of a portion of the cover by dotted lines.
Figure 3:
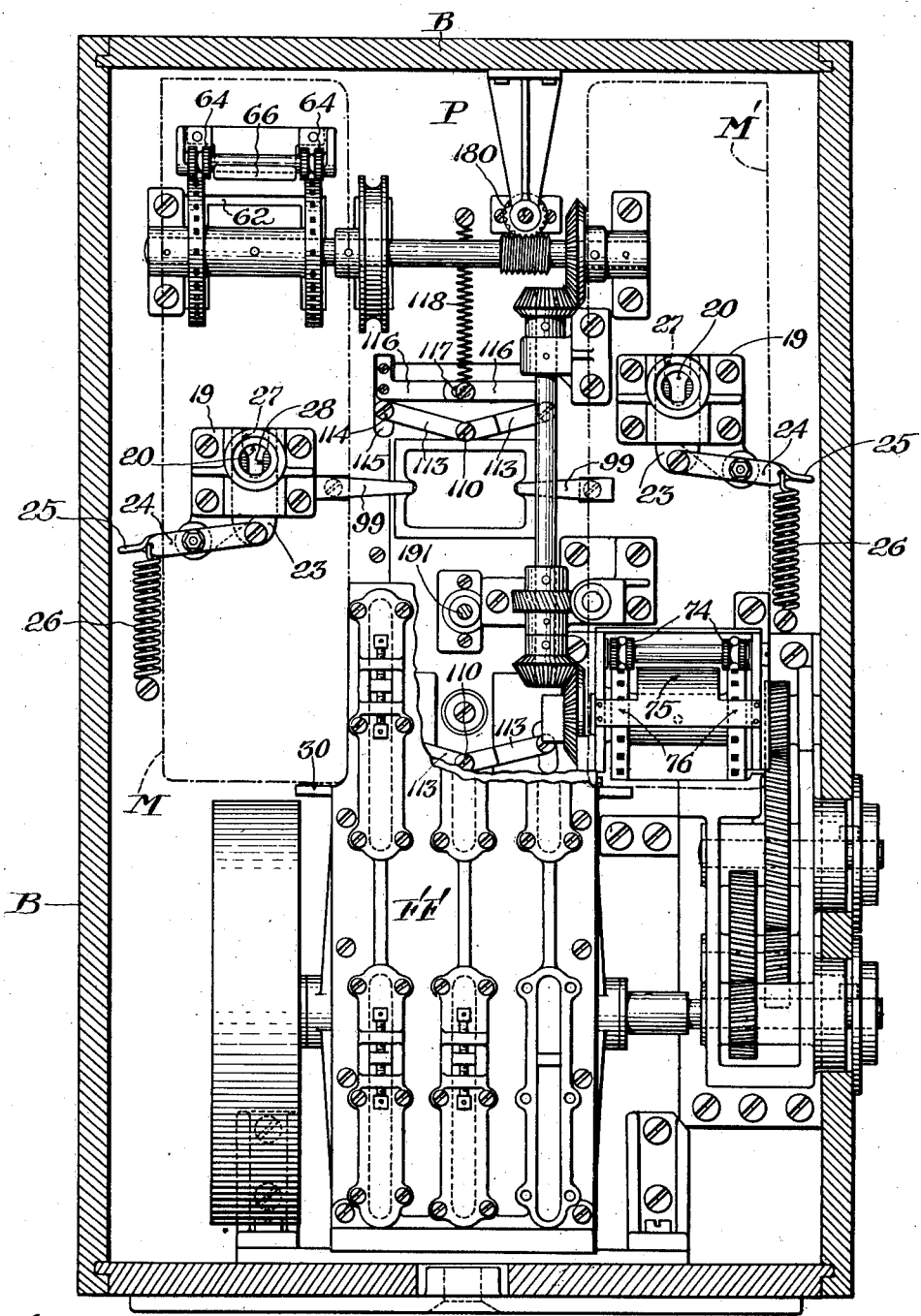
Fig. 3 is a rear elevation of the mechanism mounted on the rear of the partition P, showing parts broken away.

The unexposed reel of film is carried in a magazine M, and after exposure the film is fed into a magazine M', the positions of which are indicated by broken lines in Figs. 1 and 3. Each of the magazines is held in position with relation to the upper film sprocket by means of a member 19 mounted on the rear of the partition P and having therein a circular opening 20 to receive the head 21 of pin 22 projecting from the magazine. A slotted member 23 (Figs. 1 and 3) is arranged to be reciprocated in a vertical guide way in member 19 by means of a pivoted lever 24 having a handle 25, and a spring 26 is provided to urge the slotted member 23 upwardly. To secure a magazine in position the slotted member 23 is moved downwardly until the wide portion 27 of the slot 28 is in alinement with the opening 20 in member 19 and the magazine is moved into position with the head 21 of pin 22 projecting through the opening 20 and slot 27. The lever 24 is then released and the spring 26 forces the slotted member 23 upwardly to engage the rear face of head 21 whereby the magazine is accurately secured in position. Brackets 29 and 30 are also preferably provided to assist in supporting and positioning each magazine.

Each of the reels is rotated by means of pawl and ratchet mechanism 31, 32, as shown in Fig. 1, the pawls being controlled by springs 33. Each of the ratchet members 32 is provided with a pin 34 adapted to engage its respective reel and produce rotation thereof. The pawl and ratchet mechanism is driven by means of a coil-spring belt 35 and the mechanism is so arranged that the reels may be rotated backwardly in the event that it is desired to rewind a portion of the reel in order to make a second series of exposures on a previously exposed section of the film. An idler pulley 36 adjustably mounted on the bracket 37 is provided to control the tension of the coil-spring driving belt. Counter mechanism CM, as shown in Fig. 1, preferably is geared to the film feeding mechanism to indicate at any time the amount of film which has been exposed. The lower dial 41 may be calibrated in feet to indicate the number of feet of exposed film, and the dial 42 may be calibrated in units each of which indicates a single exposure.

Sprocket wheels 61 are mounted on the rear of the partition P to feed the film through the slot 70 in magazine M and thence through the opening 62 in the partition P to the film gate. Guide rollers 63 and 64 are mounted on the front and rear sides of the partition P to hold the film in engagement with the sprocket wheels as it passes thereover. Guards 65 and 66 are provided on the front and rear sides of the partition P to insure the film passing between the sprocket wheels and guide rollers as the end of the film is threaded through the partition opening 62. Similar sprocket wheels 71 and guide rollers 73 and 74 are provided to feed the film from the film gate through the opening in the partition P and thence through the slot 80 into the magazine M'. A guard 75, having portions 76 extending over the sprockets on wheels 71, is mounted on the rear of the partition P, as shown in Fig. 3, to prevent the film from contacting with the sprocket wheels except at and near the guide rollers 73.

As shown in Fig. 4, the film feeding mechanism FF comprises a vertically reciprocating carriage VC; vertically reciprocating frames VF arranged on opposite sides of carriage VC to counterbalance the latter; cams 51 and 52 to actuate the respective vertically reciprocating members, the cams being angularly disposed about the axis thereof in such a manner as to counterbalance the centrifugal forces of each other; two horizontally reciprocating carriages HC mounted on carriage VC; film engaging pins 41' carried by the carriage HC; and cams 53 to actuate the carriage HC.

Figure 2:
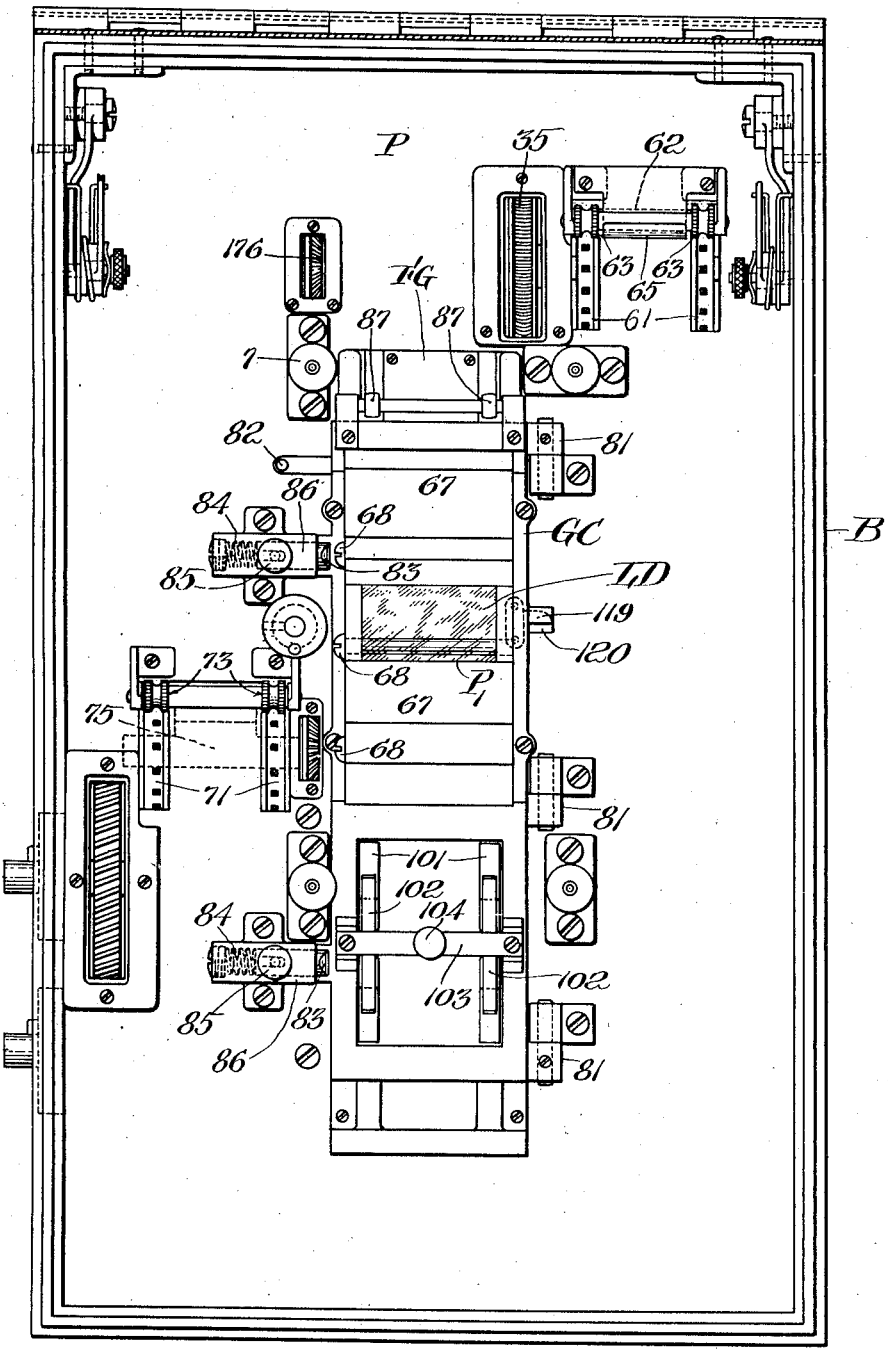
Fig. 2 is a front elevation of the camera with the cover removed.

The film-gate mechanism shown most clearly in Figs. 2, 8 and 9 comprises a filmgate FG and a film-gate cover GC hinged to swing outwardly on pivots 81. The handle 82 is provided to open the film-gate and catches 83, controlled by springs 84 and by handles 85 projecting out through slots in the casing 86, are provided to hold the filmgate cover in closed position. Rollers 87 are mounted on the upper end of the filmgate cover to extend over the film-gate passage a slight distance to the rear of the forward face thereof and to engage the margins of the forward side of the film as it enters the film-gate. A presser foot 101 is mounted on the lower end of the film-gate cover to engage the forward side of the film along each margin thereof and to urge the film against the rearward side of the film passage adjacent the slots 39 through which extend the film-engaging pins 41. As shown in Figs. 2, 4, 5 and 9, the presser foot 101 is urged toward the rearward side of filmgate passage by means of springs 102 mounted upon the cross-piece 103 carried by the film-gate cover and bearing at their ends against the presser foot. A thumb-screw 104 passes through an opening in the crosspiece 103, and is threaded into an opening in the presser foot, so that the movement of the foot toward the rear face of the filmgate passage, due to the pressure of the springs, may be limited.

As above stated, the camera herein disclosed is of the multiplex type, and is provided with light-dividing means LD mounted on the film gate cover in alinement with the main lens opening in the cover to divide the beam of light issuing from the camera lens into two similar beams and to project these two beams through openings 91 and 92 in the film gate cover to separate picture spaces on the film. The light-dividing means preferably comprises a plurality of prisms $P_1$, $P_2$, $P_3$ and $P_4$ (Fig. 4) secured within the casing 67 by means of bolts 68 and a light-dividing grid G positioned between prisms $P_1$ and $P_2$ for transmitting part of the light incident thereto and for reflecting the part of the incident light. The prisms have reflecting surfaces R for projecting the divided beam through the film gate apertures 91 and 92, and the prisms are so disposed that the paths for the two divided parts of the beam through the prisms are equal in length.

Presser members 94 and 95 are mounted directly behind the film-gate cover openings 91 and 92 to hold the film against the forward side of the film passage while being exposed. The front face of each of the presser members has a recess substantially coextensive with the corresponding picture aperture having a marginal raised portion 93 for engagement with the portion of the film surrounding the picture portion. As shown in Figs. 3 and 7, the presser member 94 is urged forwardly by means of springs 99 mounted on either side of the member. The lower presser member 95, shown in Figs. 4, 6 and 9, is arranged to be urged forwardly by a coiled compression spring 96 surrounding the pin 98 which is threaded into the presser member, and a housing 97 is mounted on the rear of the film-gate to inclose the compression spring and to form a rear bearing surface therefor.

Owing to the fact that the rollers 87 at the top of the film-gate and presser foot 101 at the bottom of the film-gate are mounted to extend to the rear of the forward face of the film passage, the sensitized coating on the forward side of the film is prevented from contacting with the passage during movement of the film. While the presser members 94 and 95 maintain the film in contact with the front of the passage during periods of film rest, the forces exerted on the presser members by springs 96 and 99 are comparatively small, and the tension produced in the portion of the film in the film-gate passage as the film is rapidly advanced is sufficient to overcome the force of the presser member springs whereby the film is held against the forward side of the film gate passage substantially only during the periods of film rest.

The means for laterally positioning the film in the film gate comprises parallel guide bars 111 having longitudinal recesses 112 (Figs. 6, 7 and 8) arranged on opposite sides of the film passage to bear against the edges of the film. The parallel guides are pivotally supported at their upper and lower ends by means of arms 113 positioned behind the film gate, as shown in Fig. 3, and pivotally connected to the guides by means of pins 114 projecting through arcuate slots 115 in the film gate. Each pair of arms 113 is pivotally supported by means of a screw 110 threaded into the rear of the film gate. The parallel guides are also connected together by means of two arms 116 rigidly secured to the rear faces of the upper ends of the guides, and connected together by means of the pin and slot connection 117 for permitting movement of the guides to and from each other, while preventing longitudinal movement of the guides with relation to each other, thereby causing the guides to move to and from each other in synchronism as a film of variable width passes therebetween. A spring 118 secured to the rear of the partition P and to the pin 117 normally holds the guides in the innermost position shown in Fig. 3. A projection 119 is secured to the central portion of the right hand guide, as shown in Fig. 8, to coöperate with the projection 120 on the film gate, whereby when the film gate is opened, the parallel guides will be forced downwardly and outwardly to release the film lightly gripped therebetween.

Owing to the connection 116—117 between the guides, neither guide can be moved in a vertical direction without causing like movement of the other guide. As either guide moves downwardly, it must necessarily move outwardly owing to the arrangement of the pivotal connection 113—115 between it and the film gate, and owing to the fact that there is such a pivotal connection both at the upper and lower ends of the guide it remains in vertical position as it moves outwardly and downwardly. As one guide is moved downwardly, it moves the other guide downwardly, and the two guides move apart at equal rates. Thus, as a film, varying slightly in width, passes through the film gate, the parallel guides move outwardly and inwardly to accommodate the varying width of the film and at all times maintain the longitudinal center line of the portion of the film being exposed in alinement with the longitudinal center line of the film gate openings. In this way the successive exposures are maintained in accurate alinement on the film.

I claim:

1. Motion picture apparatus comprising guides for laterally positioning a film and means to cause said guides to move equally and oppositely in a lateral direction and to prevent relative movement of said guides in a longitudinal direction.

2. Motion picture apparatus comprising parallel guides for laterally positioning the film, means to cause said guides to move equally and oppositely in a lateral direction, and means to prevent said guides from being moved longitudinally with relation to each other.

3. Motion picture apparatus comprising parallel guides for laterally positioning the film, means to cause said guides to move toward and from each other in arcuate paths, and means to prevent said guides from being moved longitudinally with relation to each other.

4. Motion picture apparatus comprising parallel guides for laterally positioning the film, means for pivotally supporting said guides at or near their opposite ends, and means to prevent said guides from being moved longitudinally with relation to each other.

5. Motion picture apparatus comprising guides for laterally positioning a film, means to cause said guides to move equally and oppositely in a lateral direction and to prevent relative movement of said guides in a longitudinal direction, and means yieldingly to urge said guides toward each other.

6. Motion picture apparatus comprising parallel guides for laterally positioning the film, means to cause said guides to move equally and oppositely in a lateral direction, and a laterally extensible connection between said guides to prevent relative longitudinal movement thereof.

7. Motion picture apparatus comprising a film gate, guides for laterally positioning a film in the film gate, and means including a plurality of pairs of pivot arms for controlling said guides, each of said arms being directly connected to one of said guides and also to the film gate.

8. Motion picture apparatus comprising a film gate, guides for laterally positioning a film in the film gate, and means including pivot arms for controlling said guides, said arms being pivotally connected to said guides respectively and also to a common pivot pin.

9. Motion picture apparatus comprising a film gate, guides on one side of said film gate for laterally positioning the film therein, means passing through said film gate for causing said guides to move equally and oppositely in a lateral direction, and means on the other side of said film gate to prevent said guides from being moved longitudinally with relation to one another.

10. Motion picture apparatus comprising guides for laterally positioning the film, and yielding means to urge each of said guides both inwardly against the edges of the film and in a direction opposite to the direction of film travel.

11. Motion picture apparatus comprising guides for laterally positioning a film and means whereby said guides are caused to move inwardly and outwardly in synchronism, said means including a spring arranged to urge each guide in the same direction.

12. Motion picture apparatus comprising guides for laterally positioning the film and yielding means for causing said guides to move simultaneously outwardly from the film and in the direction of film travel, and simultaneously inwardly and oppositely to the direction of film travel.

13. Motion picture apparatus comprising parallel guides for laterally positioning the film, and yielding means for causing said guides to move simultaneously in the same direction lengthwise of the film and to move simultaneously in opposite directions laterally of the film.

14. Motion picture apparatus comprising guides for laterally positioning the film, means for supporting said guides for movement in arcuate paths, and means to urge said guides both inwardly against the edges of the film and in a direction opposite to the direction of film travel.

15. Motion picture apparatus comprising parallel guides for laterally positioning the film at the exposure aperture or apertures, means for yieldingly urging said guides in the same direction along the edges of the film, and means for supporting said guides for movement in arcuate paths.

16. Motion picture apparatus comprising a film gate, guides for laterally positioning the film in said film gate, means for yieldingly urging said guides against the edges of the film, and means for supporting said guides so that the friction between each guide and the moving film tends to move said guides apart.

17. Motion picture apparatus comprising a film gate having a plurality of exposure apertures, parallel guides on opposite sides of said apertures, and means to cause said guides to move equally and oppositely in a lateral direction and to prevent relative movement of said guides in a longitudinal direction.

18. Motion picture apparatus comprising guides for laterally positioning the film and means for yieldingly supporting said guides for simultaneous movement in the direction of film travel.

19. Motion picture apparatus comprising a member having one or more picture apertures therein, means for feeding a film past said member, and means controlled by the film for intermittently holding the film against said member.

20. Motion picture apparatus comprising a member having one or more picture apertures therein, means for intermittently feeding a film past said member, and means operative in response to the tension on the film for yieldingly holding the film against said member only during periods of film rest.

21. Motion picture apparatus comprising a film gate having one or more picture apertures therein, means for intermittently moving a film in a plane substantially parallel with but slightly removed from said film gate, and means for holding the film against said film gate during periods of film rest.

22. Motion picture apparatus comprising a film gate having one or more picture apertures therein, means for intermittently moving a film in a plane substantially parallel with but slightly removed from said film gate, and yielding means for urging the film against said film gate during periods of film rest.

23. Motion picture apparatus comprising a film gate having one or more picture apertures therein, yielding means for normally holding the film against one side of said film gate, and means for intermittently advancing the film and for overcoming the force of said yielding means through the medium of the film whereby the film is released from contact with said side of said film gate during periods of advancement.

24. Motion picture apparatus comprising a film gate, means for intermittently advacing the film, guiding means to hold the film slightly removed from said film gate, a yielding presser member to hold the film against the film gate during periods of film rest and yielding under the tension of the film during periods of film advancement, thereby to release the film from contact with the film gate and prevent rubbing.

25. Motion picture apparatus comprising a film gate, means for intermittently advancing the film through said film gate, means in advance of and behind the gate aperture to hold the film out of contact with said film gate as the film is advanced, and a yieldingly mounted presser member automatically controlled by the tension of the film for holding the film against the film gate during periods of film rest.

26. Motion picture apparatus comprising a film gate having a film passage and a picture aperture therein, a pressure member yieldingly mounted behind said aperture to urge the film against said film gate, and a presser foot yieldingly mounted to engage the front surface of the film and urge the film away from said film gate.

27. Motion picture apparatus comprising a film gate having a film passage therethrough and having a picture aperture in the forward side thereof, a presser member mounted behind said picture aperture, yielding means for causing said presser member to urge the film against the forward side of said film passage, a presser foot mounted at a point displaced from said presser member along said passage, and yielding means for causing said presser foot to urge the film against the rearward side of said film passage.

28. Motion picture apparatus comprising a film gate having a film passage therethrough and having a picture aperture in the forward side thereof, a presser member mounted behind said picture aperture, yielding means for causing said presser member to urge the film against the forward side of said film passage, a presser foot mounted in a position displaced along said film passage from said presser member, yielding means for causing said presser foot to urge the film away from the forward side of said film passage, means to advance the film and to apply tension to the film while being advanced, the last said yielding means being stronger than the first said yielding means whereby the presser member is forced backwardly to release the film from engagement with the forward side of said film passage during advancement of the film.

29. Motion picture apparatus comprising a film gate, guides for laterally positioning the film in the film gate, and a plurality of pairs of separately movable pivot arms for controlling the guides, the arms of each pair being directly connected to the guides and directly connected to the film gate at equal distances from the guides.

30. Motion picture apparatus comprising a film gate, guides for laterally positioning the film in the film gate, and separate pivot arms directly connected to the guides and directly connected to a common pivot on the film gate.

31. Motion picture apparatus comprising a film gate, guides for laterally positioning the film in the film gate, means for pivotally supporting the guides so as to swing outwardly and longitudinally, and a cross-bar connecting the guides together so as to permit relative movement to and from each other but not longitudinally of each other.

32. Motion picture apparatus comprising a film gate, guides for laterally positioning the film in the film gate, means for pivotally supporting the guides so as to swing outwardly and longitudinally, a cross-bar connecting the guides together so as to permit relative movement to and from each other but not longitudinally of each other, and a spring connected to said cross-bar so as to tend to swing said guides inwardly.

Signed by me at Boston, Massachusetts, this 7th day of Sept., 1916.

WILLIAM BURTON WESCOTT.